United States Patent
Mysore Siddu et al.

(10) Patent No.: US 11,501,451 B2
(45) Date of Patent: Nov. 15, 2022

(54) DETECTING SUBJECT MOTION IN MEDICAL IMAGING

(71) Applicant: KONINKLIJKE PHILIPS N.V., Eindhoven (NL)

(72) Inventors: Dinesh Mysore Siddu, Bangalore (IN); Krishnamoorthy Palanisamy, Bangalore (IN); Christopher Stephen Hall, Kirkland, NY (US); Nagaraju Bussa, Bangalore (IN)

(73) Assignee: Koninklijke Philips N.V., Eindhoven (NL)

( * ) Notice: Subject to any disclaimer, the term of this patent is extended or adjusted under 35 U.S.C. 154(b) by 18 days.

(21) Appl. No.: 17/259,208

(22) PCT Filed: Jul. 11, 2019

(86) PCT No.: PCT/EP2019/068749
§ 371 (c)(1),
(2) Date: Jan. 11, 2021

(87) PCT Pub. No.: WO2020/011947
PCT Pub. Date: Jan. 16, 2020

(65) Prior Publication Data
US 2021/0279891 A1 Sep. 9, 2021

Related U.S. Application Data

(60) Provisional application No. 62/697,655, filed on Jul. 13, 2018.

(51) Int. Cl.
*G06T 7/246* (2017.01)
*G06T 7/194* (2017.01)

(52) U.S. Cl.
CPC .............. *G06T 7/246* (2017.01); *G06T 7/194* (2017.01); *G06T 2207/10088* (2013.01); *G06T 2207/30004* (2013.01)

(58) Field of Classification Search
USPC .................................................. 382/128, 131
See application file for complete search history.

(56) References Cited

U.S. PATENT DOCUMENTS 6,341,179 B1   1/2002   Stoyle et al.
6,518,759 B2   2/2003   Bernstein
(Continued)

OTHER PUBLICATIONS

Lorch et al., Automated Detection of Motion Artefacts in MR Imaging Using Decision Forests, J Med Eng. 2017; 2017:4501647. Published online Jun. 11, 2017. doi: 10.1155/2017/4501647, pp. 1-9. (Year: 2017).*

(Continued)

*Primary Examiner* — Ishrat I Sherali

(57) ABSTRACT

Presented are concepts for detecting subject motion in medical imaging of a subject. One such concept obtains a motion classification model representing relationships between motion of image features and subject motion values. For each of a plurality of medical slice images of an imaged volume of the subject, an image feature of the medical slice image is extracted. Based on the extracted image feature for each of the plurality of medical slice images, motion information for the image feature is determined. Based on the motion information for the image feature and the obtained motion classification model, a subject motion value is determined.

20 Claims, 15 Drawing Sheets

(56) References Cited

U.S. PATENT DOCUMENTS

| | | | | |
|---|---|---|---|---|
| 6,850,061 | B2* | 2/2005 | Stoyle | G01R 33/56509 |
| | | | | 324/306 |
| 10,664,979 | B2* | 5/2020 | Krebs | A61B 5/4848 |
| 10,810,739 | B2 | 10/2020 | Middlebrooks et al. | |
| 2015/0141800 | A1 | 5/2015 | Linguraru et al. | |

OTHER PUBLICATIONS

Meding et al., Automatic Detection of Motion Artifacts in MR Images Using CNN, 2017 IEEE 978-1-1=5090-4117-6/17, pp. 811-815. (Year: 2017).*

Chan TF et al "Active Contours Without Edges" IEEE Trans Med Imaging 2001 10(2) p. 266-277.

International Search Report and Written Opinion From PCT/EP2019/068749 dated Sep. 24, 2019.

Beque et al: "Generic feature extraction accompanieid by support vector classification: an efficient and effective way for MR image quality determination", International Society for Magnetic Resonance in Medicine, ISMRM, 2030 Addison Street, 7th Floor, Berkeley, CA 94704 USA, No. 2859, Jun. 21, 2018 (Jun. 21, 2018).

Thomas Kuestner ei al: "A Machine-learning framework for automatic reference-free quality assessment in MRI", arxiv.org, Cornell University Library, 201 Olin Library Cornell University Ithaca, NY 14853, Jun. 25, 2018 (Jun. 25, 2018), XP080894361.

Küstner ei al: "A new approach for automatic image quality assessment", International Society for Magnetic Resonance in Medicine, ISMRM, 2030 Addison Street, 7th Floor, Berkeley, CA 94704 USA, No. 2493, Jun. 5, 2015 (Jun. 5, 2015).

Fantini Irene et al: "Automatic detection of motion artifacts on MRI using Deep CNN", 2018 International Workshop on Pattern Recognition in Neuroimaging (PRNI), IEEE, Jun. 12, 2018 (Jun. 12, 2018), pp. 1-4.

Jalal B. Andre et. al "Toward Quantifying the Prevalence, Severity, and Cost Associated With Patient Motion During Clinical MR Examinations", JACR, Jul. 2015, vol. 12, Issue 7, pp. 689-695.

H. Han, W. Wen-Yuan, M. Bing-Huan, "Borderline-SMOTE: a new over-sampling method in imbalanced data sets learning," Advances in intelligent computing, 878-887, 2005.

H. M. Nguyen, E. W. Cooper, K. Kamei, "Borderline over-sampling for imbalanced data classification," International Journal of Knowledge Engineering and Soft Data Paradigms, 3(1), pp. 4-21, 2011.

He, Haibo, Yang Bai, Edwardo A. Garcia, and Shutao Li. "ADASYN: Adaptive synthetic sampling approach for imbalanced learning," In IEEE International Joint Conference on Neural Networks (IEEE World Congress on Computational Intelligence), pp. 1322-1328, 2008.

* cited by examiner

DETECTING SUBJECT MOTION IN MEDICAL IMAGING

CROSS REFERENCE TO RELATED APPLICATIONS

This application is a U.S. national phase application of International Application No. PCT/EP2019/068749 filed on Jul. 11, 2019, which claims the benefit of U.S. Provisional Application Ser. No. 62/697,655 filed Jul. 13, 2018 and is incorporated herein by reference.

FIELD OF THE INVENTION

This invention relates generally to medical imaging of a subject, such as a person or patient, and more particularly to detecting subject motion in a medical imaging of a subject.

BACKGROUND OF THE INVENTION

Subject motion during medical imaging typically causes blurring and/or artifacts in medical images that degrades image quality. Such image degradation can result in a need to repeat scans, thus resulting in decreased efficiency and increased costs.

For example, after analysing a random week of Magnetic Resonance Imaging (MRI) activity in a hospital, researchers from the University of Washington in Seattle found that subject motion can be costly in terms of repeated sequences, which occurred in approximately 20% of MRI exams. Based on such a rate require repetition, a hospital or MRI facility may over $140,000 in annual revenue per MRI scanner.

Skilled professionals tend to be able to tolerate blurring or artifacts in a medical image if it is not too severe. However, image blurring and artifacts can still result in misdiagnosis. Attempts have therefore been made to address such issues by detecting motion artifacts and applying motion correction algorithms. However, the effectiveness of such approaches is limited.

SUMMARY OF THE INVENTION

The invention aims to at least partly fulfil the aforementioned needs. To this end, the invention provides systems and methods as defined in the independent claims. The dependent claims provide advantageous embodiments.

There is provided a method for detecting subject motion in medical imaging of a subject, the method comprising: obtaining a motion classification model representing relationships between motion of image features and subject motion values; for each of a plurality of medical slice images of an imaged volume of the subject, extracting an image feature of the medical slice image; based on the extracted image feature for each of the plurality of medical slice images, determining motion information for the image feature, the motion information representing motion of the image feature in the imaged volume of the subject; and determining a subject motion value based on the motion information for the image feature and the obtained motion classification model.

Proposed is a concept for detecting the presence or absence of subject motion in medical imaging of the subject. By extracting image features from a plurality of medical slice images (which together make up an imaged volume, such as MRI DICOM volume for example), motion of the extracted image features in the imaged volume may be determined. This motion may then be analysed to determine if there is motion of the subject. Furthermore, an amount of subject motion may then be identified and classified into one of plurality of values or classifications.

Embodiments may therefore help to avoid or reduce a potential for misdiagnosis of a subject. Embodiments may also help to improved (i.e. increase) a radiologist's throughput by avoiding the assignment of severe motion cases to radiologists for interpretation/assessment.

Proposed embodiments may also be useful for identifying cases of involuntary subject motion during a medical imaging process. Preventative or corrective action may then be taken during the imaging process so as to avoid a need for repeat appointments.

Embodiments may be based on a proposal to employ one or more motion classification models which represent relationships between motion of medical image features and subject motion values. Such models may be built using conventional machine learning and/or image processing techniques, thus leveraging historical data and/or established knowledge to improve the accuracy of determinations provided by proposed embodiments.

Improved (e.g. more accurate) medical images and medical imaging-based diagnosis of a subject may therefore be facilitated by proposed embodiments. Embodiments may also be employed to improve the efficiency of a medical imaging facility, thereby providing cost savings and reduced waiting times for appointments.

Proposed embodiments may therefore be of particular relevance to Computerised Tomography (CT) scanning, Positron Emission Tomography (PET)/CT scanning and/or MRI scanning and subject diagnosis since, for example, it may help to avoid or reduce blurring or artifacts in CT images, PET/CT images and/or MRI images by detecting subject motion and facilitating preventative or corrective actions to be undertaken. Proposed concepts may also facilitate accurate assessment or diagnosis of the health of a subject using medical scanning (such as CT scanning, PET scanning or MRI scanning for example). Accordingly, an image feature may comprise a MRI feature, and a medical slice image may comprise a MRI slice image of an MRI volume. Similarly, an image feature may comprise a CT image feature, and a medical slice image may comprise a CT slice image of a CT scan volume.

In some proposed embodiments, a motion classification model may be obtained by generating the motion classification model. For instance, embodiments may generate a motion classification based on historical data relating to previously determined subject motion values for image features extracted from medical slice images. Conventional machine learning, deep learning and/or image processing techniques may thus be used to build, train and test a motion classification model. Training data and cross validation learning schemes may be employed to refine such motion classification models, thereby improving an accuracy of determinations made by embodiments.

For example, in some embodiments, the motion classification model may be refined using a machine learning algorithm with training data relating to subject motion values for image features of medical slice images. This may provide the advantage of improving the accuracy of motion classification model.

In some embodiments, the step of extracting an image feature of a medical slice image may comprise: separating the medical slice image into a foreground and a background; and extracting a foreground image feature from the foreground. Further, extracting a foreground image feature may comprise identifying an image feature from at least one of:

a spatial domain representation of the foreground; a wavelet domain representation of the foreground; and a spectral domain representation of the foreground. The identified image feature may then be extracted as the foreground image feature.

Additionally, or alternatively, the step extracting an image feature of a medical slice image may comprise: segregating the medical slice image into a foreground and a background; and extracting a background image feature from the background. Further, extracting a background image feature may comprise: applying radon transformations to the background to generate a plurality of radon transform profiles; and identifying a feature based on the radon transform profiles. The identified feature may then be extracted as the background image feature.

Accordingly, in some embodiments, motion information may be obtained from both foreground and background images. By way of example, to accomplish foreground and background segregation, embodiments may employ conventional region-based active contour methods (such as Chan T F, Vese L. Active contours without edges. IEEE Trans Med Imaging. 2001; 10(2):266-77). Also, foreground and background segregation may be applied on individual medical slice images that together form an imaged volume. In this way, proposed embodiments may be used to detect (and potentially distinguish between) subject motion in foreground and background images.

Some embodiments may further comprise the step of, based on the motion information for the image feature, identifying a medical slice image in which motion of the extracted image feature exceeds a threshold value. Simple comparison methods may therefore be employed to identify slices (e.g. individual image planes) of an imaged volume which include severe subject motion for example. Straightforward and reduced-complexity implementations that facilitate accurate identification of the location of movement within an imaged volume may thus be realised.

Further, By way of example, embodiments may include determining the threshold value or model based on historical data relating to previously determined motion of the image feature. Taking account of previously obtained or determined information may improve accuracy of determinations or assessments, for example, via comparison and/or refinement of the threshold value or model based on the historical data.

In some embodiments, the motion classification model may represent relationships between motion of image features and subject motion values for a plurality of different classification methods. The step of determining a subject motion value may then comprise: selecting relationships between motion of image features and subject motion values for one of the plurality of different classification methods based on the extracted image feature; and determining a subject motion value based on the motion information for the image feature and the selected relationships between motion of image features and subject motion values. In this way, various classification methods may be employed, and then a preferred (e.g. most appropriate) classification method may be selected according to an extracted image feature. Since, performance or accuracy of a classification method may depend on a selected image feature, this approach caters for various different image features being selected whilst also enabling an optimum or preferred classification method to be used. Improved (e.g. more accurate) results may thus be provided for a range of extracted features.

Embodiments may further comprise the step of generating an output signal based on the determined subject motion value. Embodiments may be adapted to provide such an output signal to at least one of: the subject; a medical practitioner; medical imaging apparatus operator; and a radiographer. The output signal may thus be provided to a user or medical imaging apparatus for the purpose of indicating the presence and/or severity of subject motion for example.

Some embodiments may further comprise the step of generating a control signal for modifying a graphical element based on the subject motion value. The graphical element may then be displayed in accordance with the control signal. In this way, a user (such as a radiologist) may have an appropriately arranged display system that can receive and display information about detected motion of the subject, and that user may be remotely located from the subject. Embodiments may therefore enable a user to remotely detect and monitor motion of a subject (e.g. patient).

According to yet another aspect of the invention, there is provided computer program product for detecting subject motion in medical imaging of a subject, wherein the computer program product comprises a computer-readable storage medium having computer-readable program code embodied therewith, the computer-readable program code configured to perform all of the steps of an embodiment.

A computer system may be provided which comprises: a computer program product according to an embodiment; and one or more processors adapted to perform a method according to an embodiment by execution of the computer-readable program code of said computer program product.

In a further aspect, the invention relates to a computer-readable non-transitory storage medium comprising instructions which, when executed by a processing device, execute the steps of the method of detecting subject motion in medical imaging of a subject according to an embodiment.

According to another aspect of the invention, there is provided a system for detecting subject motion in medical imaging of a subject, the system comprising: an interface component adapted to obtain a motion classification model representing relationships between motion of image features and subject motion values; a feature extraction component adapted, for each of a plurality of medical slice images of an imaged volume of the subject, extract an image feature of the medical slice image; a data processing component adapted to determine motion information for the image feature based on the extracted image feature for each of the plurality of medical slice images, the motion information representing motion of the image feature in the imaged volume of the subject; and a motion determination component adapted to determine a subject motion value based on the motion information for the image feature and the obtained motion classification model.

It will be appreciated that all or part of a proposed system may comprise one or more data processors. For example, the system may be implemented using a single processor which is adapted to undertake data processing in order to determine subject motion.

The system for detecting subject motion in medical imaging of a subject may be remotely located from the medical imaging apparatus, and medical image data may be communicated to the system unit via a communication link.

The system may comprise: a server device comprising the interface component, feature extraction component and data processing component; and a client device comprising the motion determination component. Dedicated data processing means may therefore be employed for the purpose of determining motion information, thus reducing processing requirements or capabilities of other components or devices of the system.

The system may further comprise a client device, wherein the client device comprises the interface component, feature extraction component, data processing component and motion determination component. In other words, a user (such as a radiologist) may have an appropriately arranged client device (such as a laptop, tablet computer, mobile phone, PDA, etc.) which processes received medical image data (e.g. medical slice images) in order to determine a subject motion value.

Thus, processing may be hosted at a different location from where the medical imaging happens. For example, for reasons of computing efficiency it might be advantageous to execute only part of the processing at the medical imaging location, thereby reducing associated costs, processing power, transmission requirements, etc.

Thus, it will be understood that processing capabilities may therefore be distributed throughout the system in different ways according to predetermined constraints and/or availability of processing resources.

Embodiments may also enable some of the processing load to be distributed throughout the system. For example, pre-processing may be undertaken at a medical imaging system. Alternatively, or additionally, processing could be undertaken at a communication gateway. In some embodiments, processing may be undertaken at a remote gateway or sever, thus relinquishing processing requirements from an end-user or output device. Such distribution of processing and/or hardware may allow for improved maintenance abilities (e.g. by centralising complex or expensive hardware in a preferred location). It may also enable computational load and/or traffic to be designed or located within a networked system according to the processing capabilities available. A preferable approach may be to process medical image data locally and transmit extracted data for full processing at a remote server.

Embodiments may be implemented in conjunction with pre-existing, pre-installed or otherwise separately-provisioned medical imaging apparatus (such as a CT scanner, PET scanner or MRI scanner), and signals, data or images from such apparatus may be received and processed in accordance with proposed concepts. Other embodiments may be provided with (e.g. integrated into) medical imaging apparatus (such as CT scanning apparatus or an MRI scanner).

These and other aspects of the invention will be apparent from and elucidated with reference to the embodiment(s) described hereinafter.

BRIEF DESCRIPTION OF THE DRAWINGS

Examples in accordance with aspects of the invention will now be described in detail with reference to the accompanying drawings, in which.

DETAILED DESCRIPTION OF THE EMBODIMENTS

Figure 1:
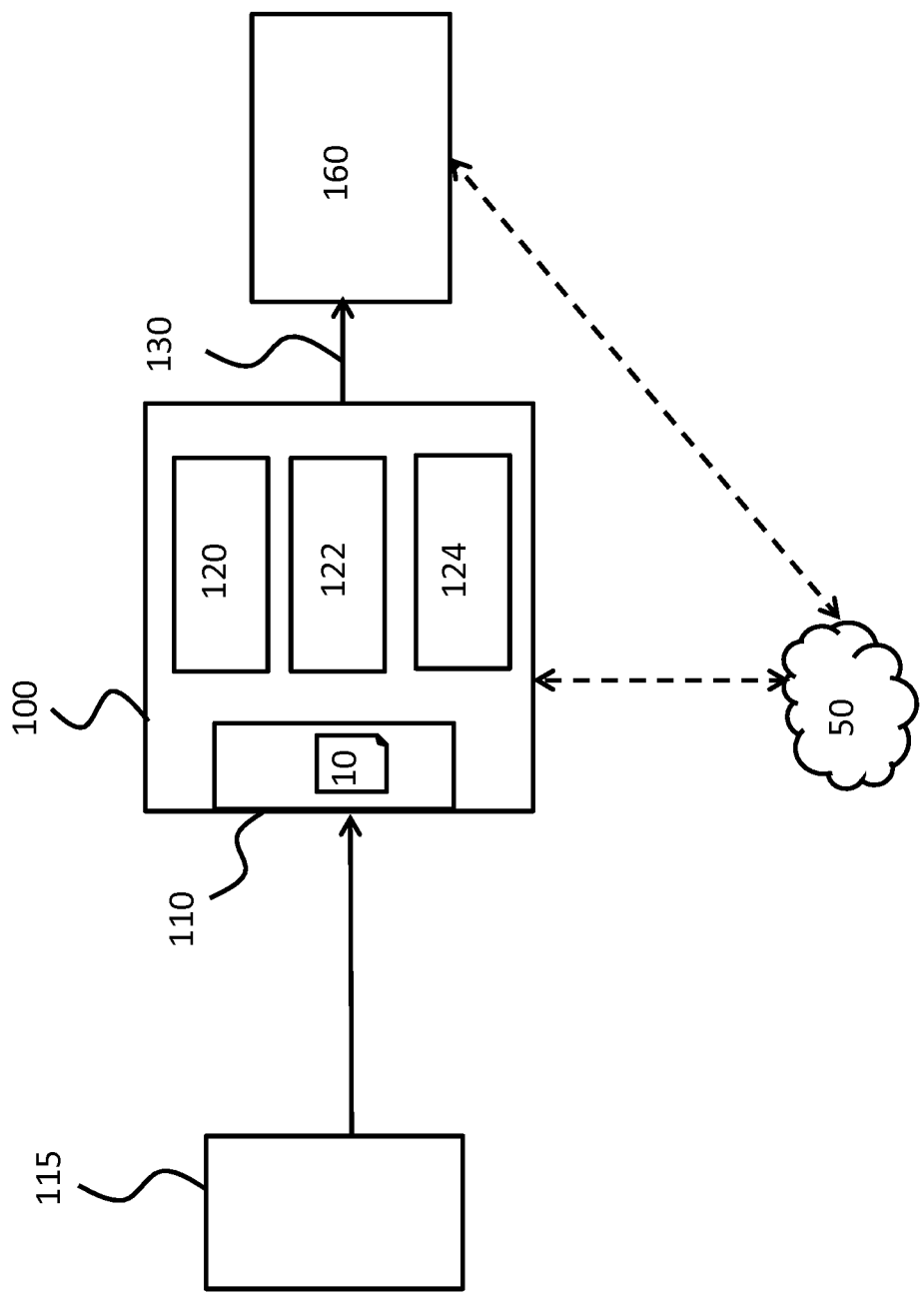
FIG. 1 is a simplified block diagram of a system for detecting subject motion in a MRI scan of a subject according to an embodiment.

Proposed is a concept for detecting the presence or absence of subject motion during a medical scan. This may enable the identification of subject motion in a given imaging volume (such as a MRI DICOM volume) that is formed from medical image slices. It may, for example, facilitate the identification of medical image slices that include different grades or levels of motion artifacts.

To enable the detection of subject motion, image features may be extracted from medical images and then motion information representative of motion of the extracted image features within the imaged volume may be determined. The determined motion information may then be analysed in conjunction with a motion classification model representing relationships between motion of image features and subject motion values, thereby enabling the determination of a subject motion value or classification for the extracted feature(s).

Use of a motion classification model may enable movement of extracted image features to be quantified or classified based on established or learnt information about motion of features in medical images/volumes and subject motion. Such models may be developed based on traditional image processing and machine-learning techniques for improved accuracy.

Embodiments may, for example, be useful for improving medical scanning and assessment of subjects. Such subjects may, for instance, include a disabled person, an elderly person, an injured person, a medical patient, etc. Elderly persons can mean persons above 50 years, above 65 years, above 70, or above 80 years old, for example.

Illustrative embodiments may be utilized in many different types of medical imaging apparatus and/or medical imaging facilities, such as a hospital, ward, research facility, etc.

By way of example, subject motion detection may be useful while allocating or scheduling cases for radiologists. Using a proposed embodiment, a user may, for example, filter all the severe subject motion cases to increase the throughput of radiologists.

Also, embodiments may be integrated in medical imaging systems to provide real-time feedback to technicians regarding detected subject motion (e.g. involuntary patient motion) while scanning is in progress. Using such feedback, a technician may check the severity of the motion and, if necessary, abandon and restart the scanning while the subject is still on the scanner table. In this way, a subject need not re-visit the medical imaging facility for a repeat scan.

Proposed embodiments may identify mild/minor subject motion in medical images. The motion artifacts may then be corrected using suitable motion correction algorithms.

In order to provide a context for the description of elements and functionality of the illustrative embodiments, the Figures are provided hereafter as examples of how aspects of the illustrative embodiments may be implemented. It should therefore be appreciated the Figures are only examples and are not intended to assert or imply any limitation with regard to the environments, systems or methods in which aspects or embodiments of the present invention may be implemented.

Embodiments of the present invention are directed toward enabling motion of a subject in a medical scan to be detected and potentially classified. This be useful for improving scanning accuracy or efficiency, e.g. by avoiding or reducing a number of medical scans that a ruined by subject motion.

Embodiments may employ conventional machine-learning and image processing techniques to build subject motion classification models for identifying or classifying a severity of the motion based on movement of image features in medical images. Based on training data (e.g. historical data. previously-established results and/or previous observations), feature selection and cross-validation learning schemes may be employed to generate the classification models. Such models may then also be tested (e.g. using test data) by selecting and extracting image features from medical images and using the models to determine (e.g. classify) severity of subject motion (which can then be check/compared against established or correct results).

By determining a measure or classification of subject motion from one or more features of medical slice images, embodiments may enable the identification of subject motion that is significant and/or representative of motion that cannot be catered for (e.g. corrected, ignored or read through). This may help to reduce a number of wasted medical scans and provide improved medical images. Thus, embodiments may be useful for real-time medical scan monitoring purposes, for example to assess if a subject is moving excessively during a medical scanning process.

Subject motion may be detected or classified from medical slice images produced by medical imaging devices and systems that already exist. Accordingly, the proposed concepts may be used in conjunction with existing medical imaging systems/methods (such as those employed for CT, PET/CT and/or MRI scanning for example). Because many such medical imaging methods/systems are known and any one or more of these may be employed, detailed description of such methods/systems is omitted from this description.

FIG. 1 shows an embodiment of a system 100 for detecting subject motion in a MRI scan of a subject according to an embodiment.

The system 100 comprises an interface component 110 adapted to obtain a motion classification model 10 representing relationships between motion of MRI features and subject motion values. Here, the interface component 110 is adapted to generate a motion classification model based on historical data 115 (e.g. stored in a database) relating to previously determined subject motion values for MRI features extracted from MRI slice images.

The historical data 115 is communicated to the interface component 110 via a wired or wireless connection. By way of example, the wireless connection may comprise a short-to-medium-range communication link. For the avoidance of doubt, short-to-medium-range communication link may be taken to mean a short-range or medium-range communication link having a range of up to around one hundred (100) meters. In short-range communication links designed for very short communication distances, signals typically travel from a few centimetres to several meters, whereas, in medium-range communication links designed for short to medium communication distances, signals typically travel up to one hundred (10)0 meters. Examples of short-range wireless communication links are ANT+, Bluetooth, Bluetooth low energy, IEEE 802.15.4, ISA100a, Infrared (IrDA), Near Field Communication (NFC), RFID, 6LoWPAN, UWB, Wireless HART, Wireless HD, Wireless USB, ZigBee. Examples of medium-range communication links include Wi-Fi, ISM Band, Z-Wave. Here, the output signals are not encrypted for communication via the wired or wireless connection in a secured manner. However, it will be appreciated that, in other embodiment, one or more encryption techniques and/or one or more secure communication links may be employed for the communication of signals/data in the system.

Furthermore, in the example of FIG. 1, the interface component is adapted to refine the motion classification model using a machine-learning algorithm with training data relating to subject motion values for MRI features of MRI slice images.

The system 100 also comprises a feature extraction component 120 adapted, for each of a plurality of MRI slice images of an MRI volume of the subject, to extract an MRI feature of the MRI slice image. More specifically, in this example, the feature extraction component 120 is adapted to separate the MRI slice image into a foreground and a background, and to then extract at least one of: a foreground MRI feature from the foreground; and a background MRI feature from the background By way of example, to extract a foreground MRI feature, the feature extraction component 120 is adapted to identify a feature from at least one of: a spatial domain representation of the foreground; a wavelet domain representation of the foreground; and a spectral domain representation of the foreground. The identified features is then extracting as the foreground MRI feature.

By way of further example, to extract a background MRI feature, the feature extraction component 120 is adapted to apply radon transformations to the background so as to generate a plurality of radon transform profiles. The feature extraction component 120 is then adapted to identify a feature based on the radon transform profiles, and extracts the identified feature as the background MRI feature.

The system 100 further comprises a data processing component 122 that is adapted to determine motion information for the MRI feature based on the extracted MRI feature for each of the plurality of MRI slice images. More specifically, the motion information determined by the data processing component 122 represents motion of the MRI feature in the MRI volume of the subject.

For this purpose, the data processing component 122 of the system 100 may communicate with one or more data processing resources available in the internet or "cloud" 50. Such data processing resources may undertake part or all of the processing required to determine motion information for an extracted MRI feature.

The determined motion information is provided to a motion determination component 124 of the system 110. The motion determination component 124 is adapted to determine a subject motion value based on the motion information for the MRI feature and the obtained motion classification model. Again, for this purpose, the motion determination component 124 may communicate with one or more data processing resources available in the internet or "cloud" 50. Such data processing resources may undertake part or all of the processing required to determine a subject motion value.

Thus, it will be appreciated that the embodiment may employ distributed processing principles.

The data processing system 110 is further adapted to generate an output signal 130 representative of a determined subject motion value. In other words, after determining a subject motion value based on motion information for the MRI feature and the obtained motion classification model (either with or without communicating with data processing resources via the internet or "cloud"), an output signal 130 representative of or determined subject motion value is generated.

The system further comprises a graphical user interface (GUI) 160 for providing information to one or more users. The output signal 130 is provided to the GUI 160 via wired or wireless connection. By way of example, the wireless connection may comprise a short-to-medium-range communication link. As indicated in FIG. 1, the output signal 130 is provided to the GUI 160 from the data processing unit 110. However, where the system, has made use of data processing resources via the internet or cloud 50), an output signal may be made available to the GUI 160 via the internet or cloud 50.

Based on the output signal 130, the GUI 160 is adapted to communicate information by displaying one or more graphical elements in a display area of the GUI 160. In this way, the system may communicate information about a subject motion value that may be useful for indicating if the subject has moved excessively during a MRI scanning process. For example, the GUI 160 may be used to display graphical elements to a medical practitioner, a radiologist, a MRI apparatus operator, MRI technician or the like. Alternatively, or in addition, the GUI 160 may be adapted to display graphical elements to the subject.

From the above description of the embodiments of FIG. 1, it will be understood that there is proposed a system for identifying subject motion in a MRI scan of the subject. The scan is assumed to be of a imaged volume (e.g. 3D segment or part) of the subject and formed from a plurality of parallel MRI slice images that are offset from each other along a central axis of the volume (with each MRI slice image being in a plane perpendicular to the central axis).

Accordingly, based on the motion information for an extracted MRI feature, an MRI slice image in which motion of the extracted MRI feature exceeds a threshold value may be identified. In this way, MRI slice images in which feature motion is excessive (e.g. exceeds an acceptable amount) may be identified. The location(s) of excessive motion in the scanned volume may therefore be identified, further helping to establish if and how the subject motion may have occurred.

By way of further example, the threshold value may be determined (e.g. calculated) based on historical data relating to previously determined motion of the MRI feature. In this way, a threshold value for distinguishing excessive subject motion from acceptable (e.g. correctable or fixable) subject motion may be refined or improved for improved accuracy or usability.

Although the example embodiment of FIG. 1 detailed above is described in relation to MRI scanning, it will be appreciated that proposed concepts may be extended to other medical scanning modalities such as CT scanning, PET scanning and the like.

Also, from the above description, it will be understood that a proposed method according to an embodiment may comprise the following main stages:

(i) Model Acquisition—obtaining a motion classification model representing relationships between motion of image features and subject motion values;

(ii) Feature Extraction—feature extraction from medical images to capture motion information caused due to patient motion;

(iii) Volume-Level Feature Determination—for deriving motion information at volume level, since feature extraction is at slice level; and (iv) Motion Classification—classification of the motion information for identifying an amount or level of subject motion.

Exemplary approaches for these main stages will now be detailed below.

Model Acquisition

Embodiments may employ traditional machine-learning, deep learning and/or image processing techniques to build motion classification models which link image feature motion to various levels or classification of subject motion. Thus, such models may be derived from historical information relating to previous test result and/or observations, and the models may be trained and tested using various forms of input data.

Based on the training data, feature selection and cross-validation of learning schemes may be employed to generate classification models.

Feature Extraction

From medical images, features may be extracted from both foreground and background images.

By way of example, to accomplish foreground and background segregation, embodiments may employ Chan and Vese's region-based active contour method (Chan T F, Vese L. Active contours without edges. IEEE Trans Med Imaging. 2001; 10(2):266-77) with 350 iterations and defining the initial mask as equivalent to 1 pixel size less than original image size.

Foreground and background segregation may be applied on individual slices in a volume.

Figure 2:
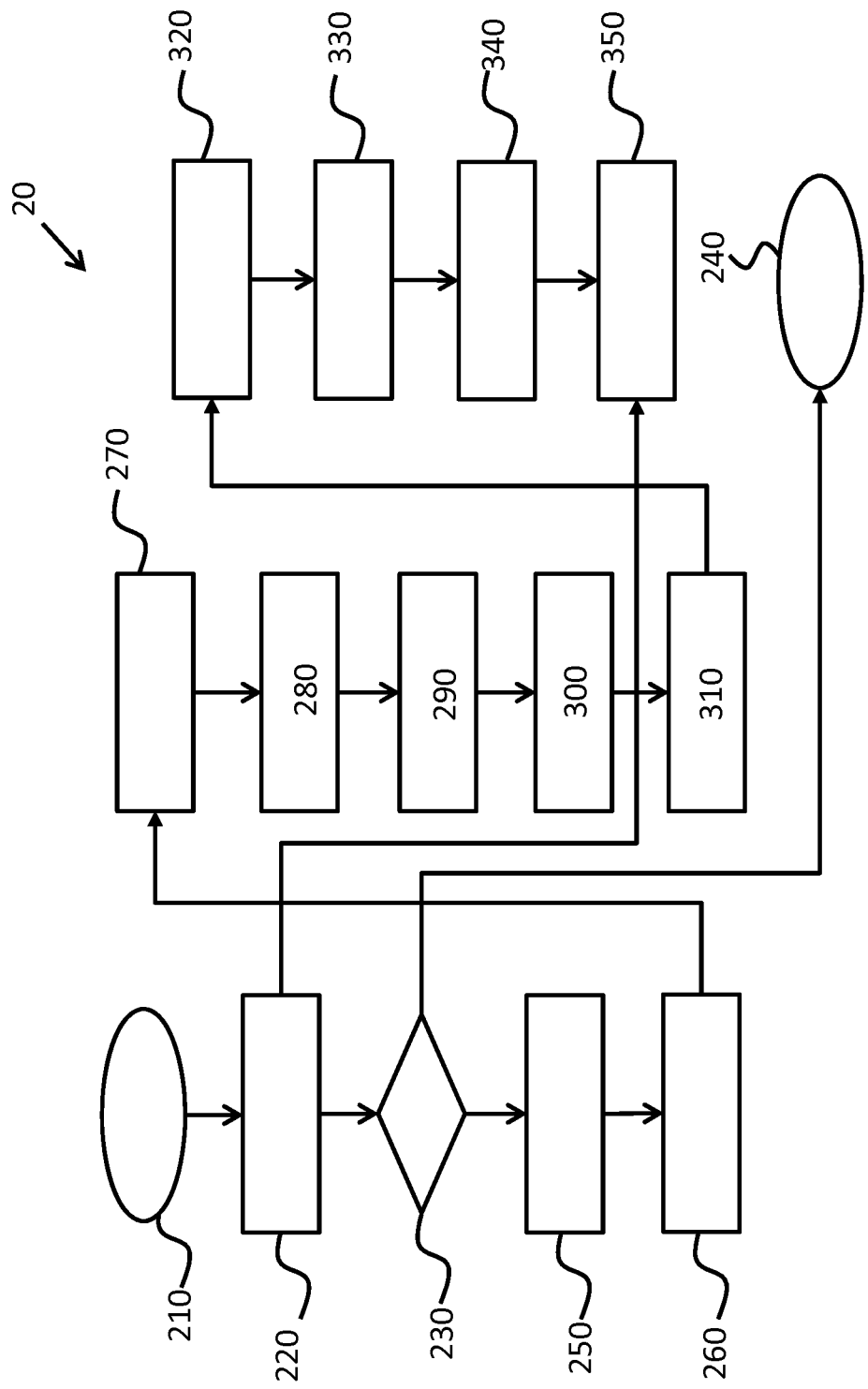
FIG. 2 is a flow diagram of an exemplary foreground and background segregation algorithm that may be employed by an embodiment.

By way of example, a flow diagram of a foreground and background segregation algorithm 20 that may be employed is depicted in FIG. 2.

In FIG. 2, steps 210 through 260 comprise loading of imaging volume (step 220) to separate the foreground and background for each slice (steps 250 and 260). In step 230, it is checked if all medical slice images have been subjected to the segregation. If they have, the process ends in step 240. After segregation of steps 250 and 260, the medical slice image is re-sized in step 270 and the mask is initialized in step 280 in both the horizontal and vertical direction. A Chan and Vese's segmentation method is applied in step 300 with the pre-defined number of iterations identified in step 290 and the segmented image is subjected to filling (step 310) and dilation (step 320) operations and subsequently resized to original size (step 330) to obtain the foreground (step 340) and background (step 350) separated image.

Foreground Feature Extraction

Figure 3:
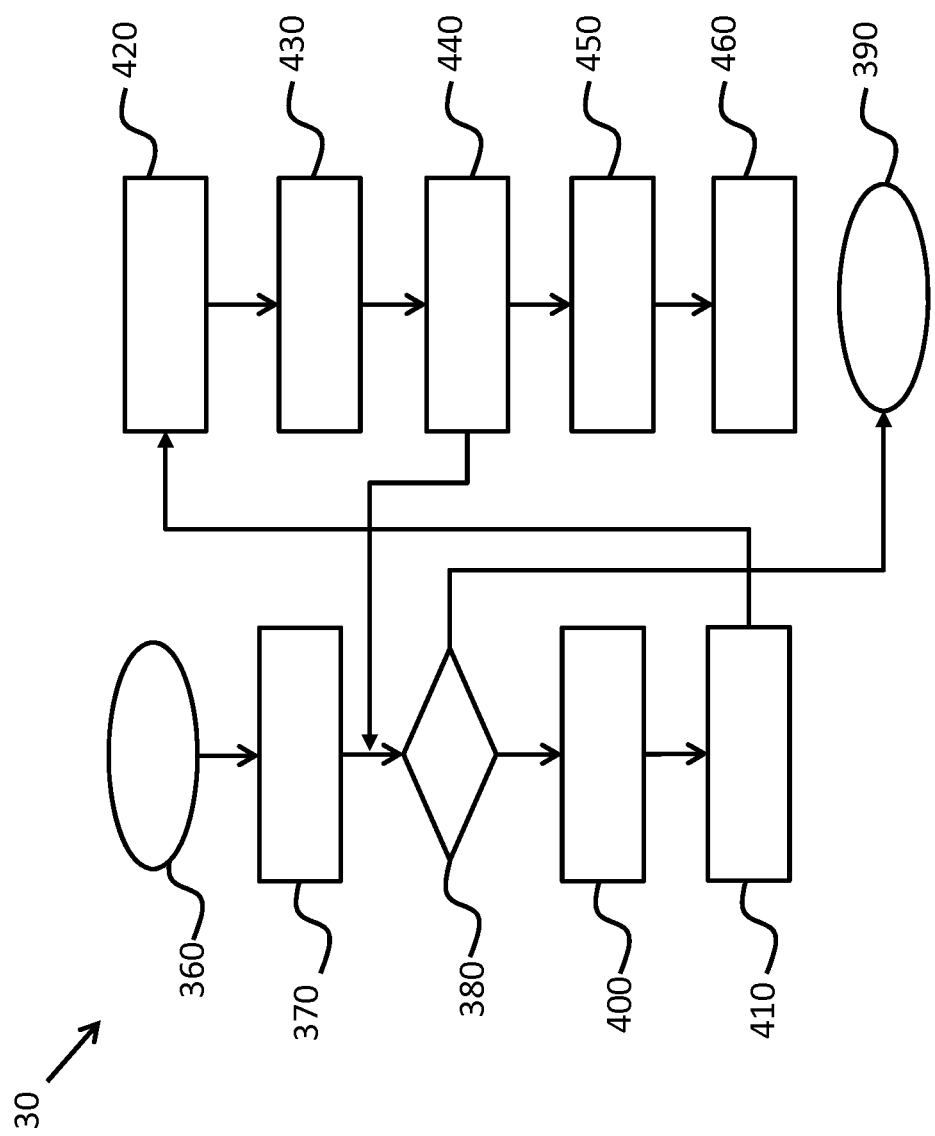
FIG. 3 is a flow diagram of a method for extracting image features from foreground images that may be employed by an embodiment.

Referring now to FIG. 3, there is depicted a flow diagram of a method 30 for extracting image features from foreground images. Such a feature extraction technique may thus be used for capturing motion information caused due to subject motion in foreground images.

In FIG. 3, the steps 360 through 410 comprise loading of imaging volume (step 370) to extract the foreground and background features for each medical image slice of the imaging volume (steps 400 and 410). In step 380, it is checked if all medical slice images have been subjected to the feature extraction. If they have, the process ends in step 390.

First for each medical slice image of the imaging volume, foreground and background images are separated (step 420). Feature are extracted from the foreground image (step 430), spatial domain representation (step 440), spectral domain representation (step 450) and wavelet domain representation (step 460).

FIG. 3 thus depicts a method (30) for feature extraction in which a foreground and background segregation algorithm is employed to keep only foreground information of the image by discarding the information that exists in background of the image.

Figure 4A:
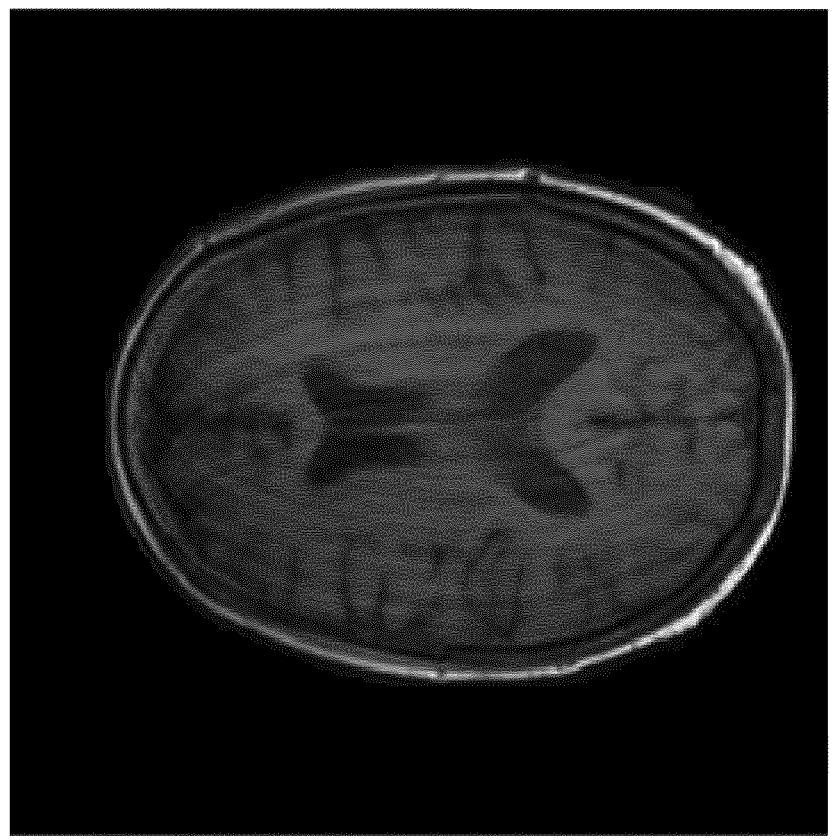
FIG. 4A illustrates an example of an MRI image wherein only foreground information of the image has been maintained (and wherein the background information has been removed)
Figure 4B:
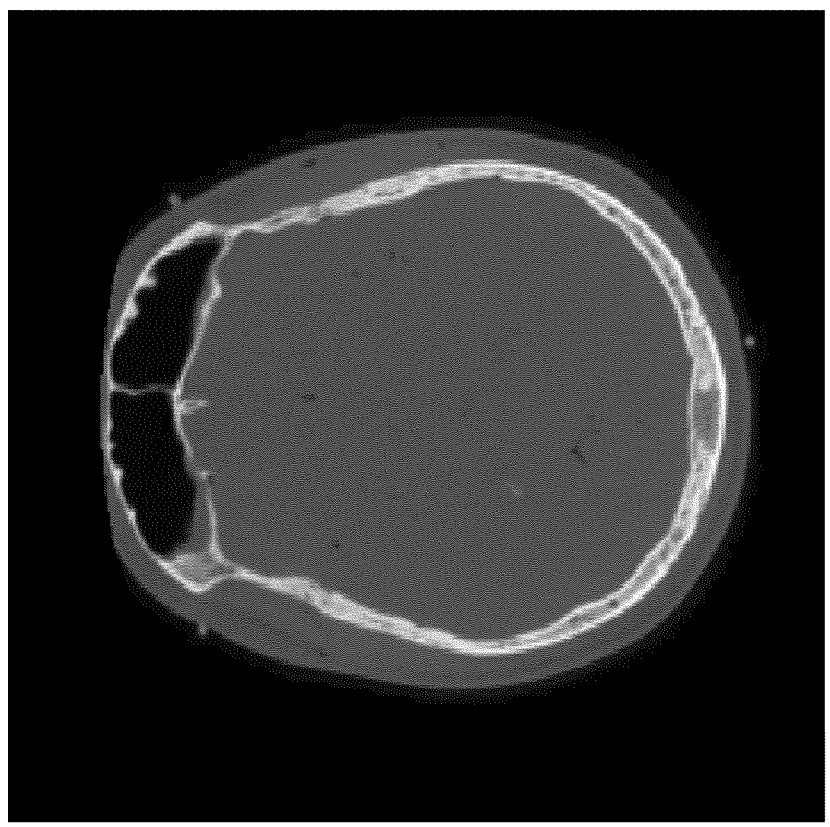
FIG. 4B illustrates an example of a CT image wherein only foreground information of the image has been maintained (and wherein the background information has been removed)

An example of an MRI image wherein only foreground information of the image has been maintained is depicted in FIG. 4A Further, an example of a CT image wherein only foreground information of the image has been maintained is depicted in FIG. 4B.

On the foreground image, image features may be extracted from a spatial, spectral and/or wavelet domain representation of the image. For example:

Spatial Features: As a part of spatial feature set, on foreground images, spatial domain features such as image resolution features, histogram based features, autocorrelation features and focus features may be extracted.

Spectral features: As a part of spectral feature set, on foreground images, frequency spectrum features such as spectral histogram and spectral energy based features may be extracted.

Figure 5A:
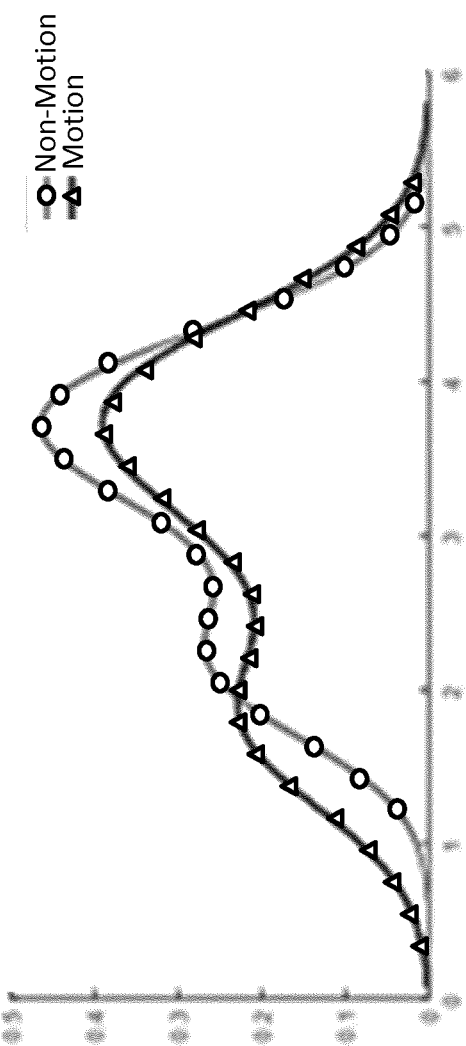
FIG. 5A depicts a distribution plot in the spatial domain for motion and non-motion cases, wherein the distribution plot for the non-motion case is depicted using a line indicated with circles, and wherein the plot for the motion case is depicted using a line indicated with triangles.

By way of example, FIG. 5A depicts a distribution plot in the spatial domain for motion and non-motion cases. The distribution plot for the non-motion case is depicted using a line indicated with circles, whereas the plot for the motion case is depicted using a line indicated with triangles. From FIG. 5A it can be seen that the distribution plot in the spatial domain for the non-motion case is narrower and has a higher peak value than that of the motion case.

Figure 5B:
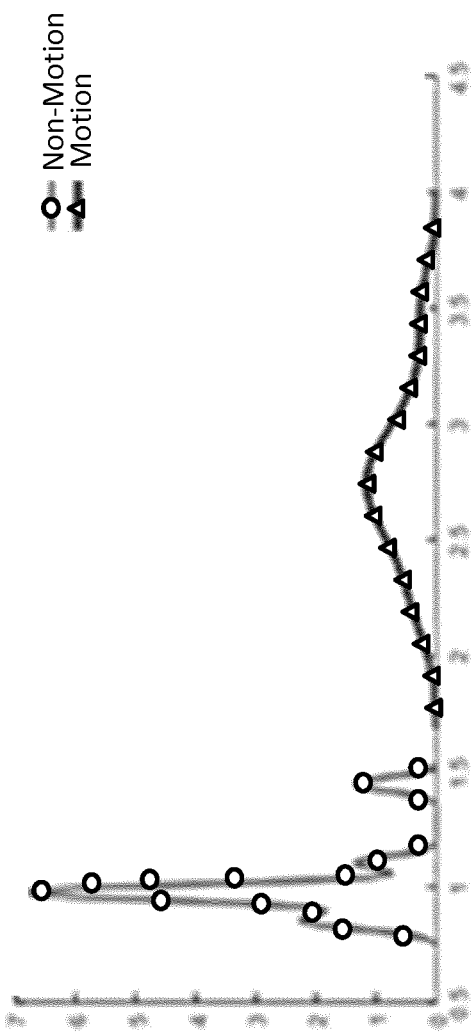
FIG. 5B depicts a distribution plot in the spectral domain for motion and non-motion cases, wherein the distribution plot for the non-motion case is depicted using a line indicated with circles, and wherein the plot for the motion case is depicted using a line indicated with triangles.

By way of further example, FIG. 5B depicts a distribution plot in the spectral domain for motion and non-motion cases. The distribution plot for the non-motion case is depicted using a line indicated with circles, whereas the plot for the motion case is depicted using a line indicated with triangles. From FIG. 5B it can be seen that the distribution plot in the spectral domain for the non-motion case is narrower, shifted left and has a higher peak value than that of the motion case.

Figure 6:
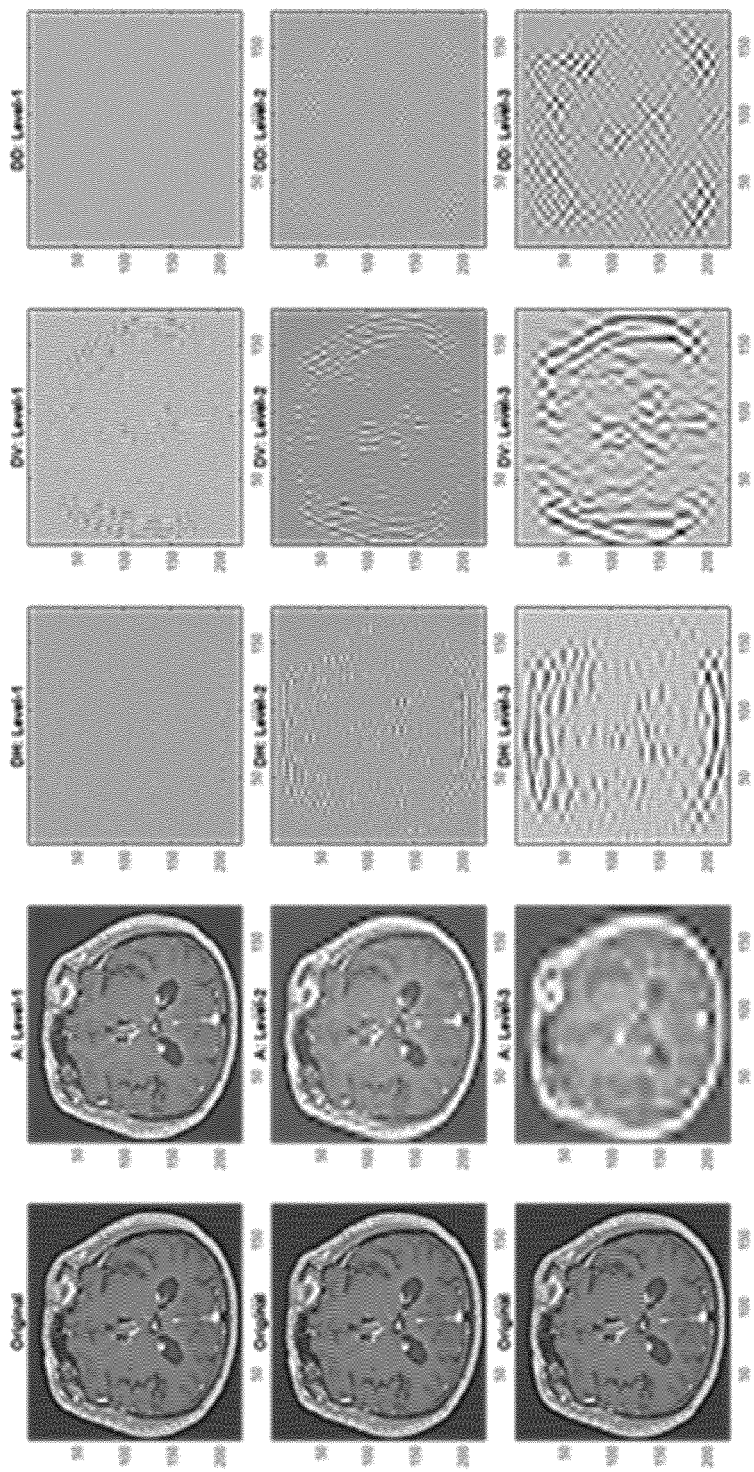
FIG. 6 depicts exemplary wavelet decomposition images of motion and non-motion cases.

Wavelet features: As a part of wavelet feature set, on foreground images, wavelet decomposition, and wavelet packed decomposition features may be extracted. By way of example, FIG. 6 depicts the wavelet decomposition images of motion and non-motion cases. In FIG. 6, the first (i.e. top) to third (i.e. bottom) row of images correspond to approximation and detailed coefficients for no motion, moderate motion and severe motion examples, respectively.

Background Feature Extraction

Inspired by the natural wave formed ripples, embodiment may employ feature extraction techniques to capture motion ripples caused by subject motion in background images. For example, referring to FIG. 7, there is depicted a flow diagram of a method for extracting image features from background images.

Figure 7:
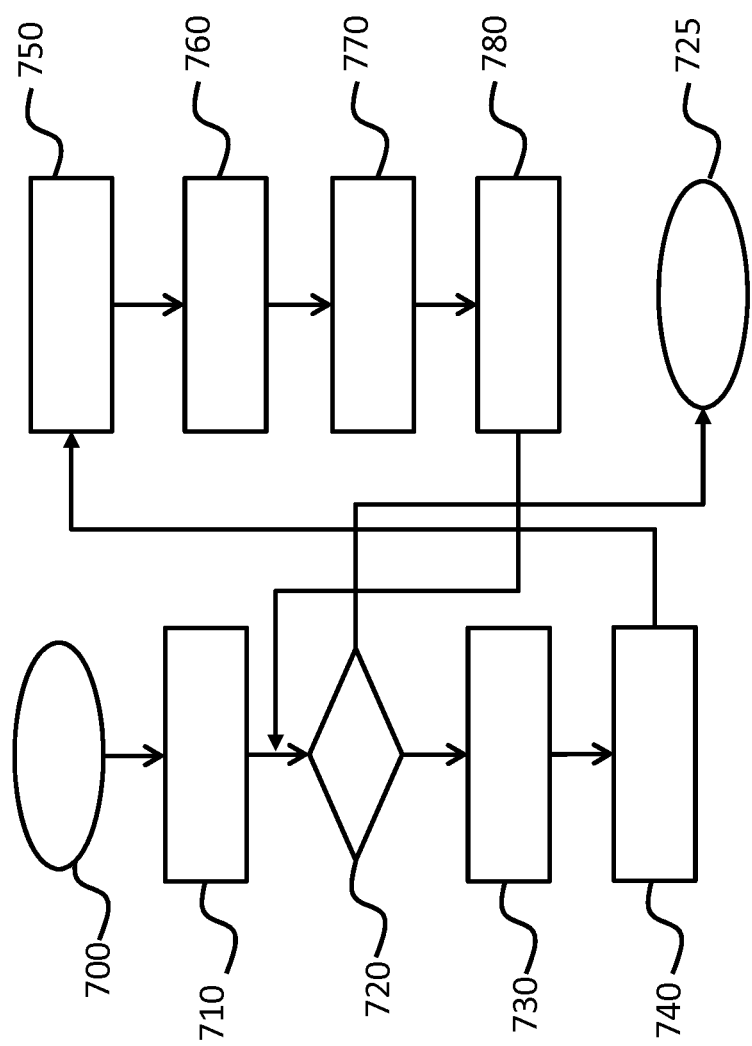
FIG. 7 is a flow diagram of an exemplary method for extracting image features from background images that may be employed by an embodiment.

In FIG. 7, the steps 700 through 740 comprise loading of imaging volume (step 710) to extract the background features of each slice (steps 730 and 740). In step 720, it is checked if all medical slice images have been subjected to the feature extraction process. If they have, the process ends in step 725. First for each medical slice image of the imaged volume, foreground and background images are separated (step 750). The separated background image is obtained (step 760) and a radon transformation then applied at different orientations (step 770) to generate various statistical measures (step 780) that act as background features for classifier models.

Figure 8:
FIG. 8 shows an example of how motion ripples may be visible in background images of an MRI slice image.

Referring now to FIG. 8, there is shown an example of how motion ripples may be visible in background images of an MRI slice image.

Figure 9:
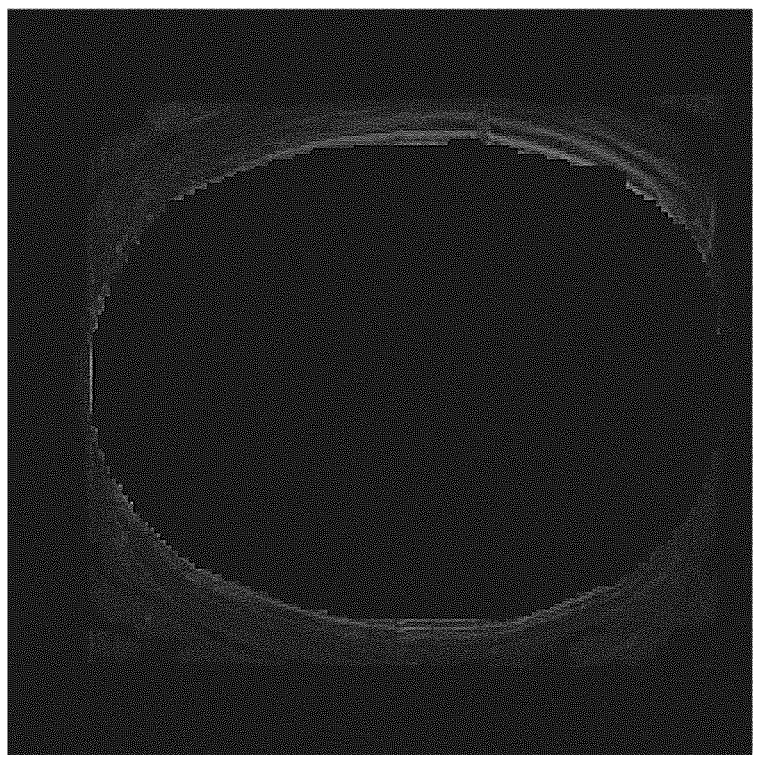
FIG. 9 illustrates an example of motion ripples may be visualised using foreground and background segregation.

Using foreground and background segregation (as exemplified by the method of FIG. 2), background images with motion ripples were captured as shown in FIG. 9. Here, on the background image, a radon transform was applied at 1, 45, 90 and 135 degrees to get 1-Dimensional profiles. Thirty-eight features based on the peaks, envelope and rms values were then extracted from radon transform profiles.

Sample background feature value plots are shown in FIG. 10 for motion and non-motion images.

Figure 10A:
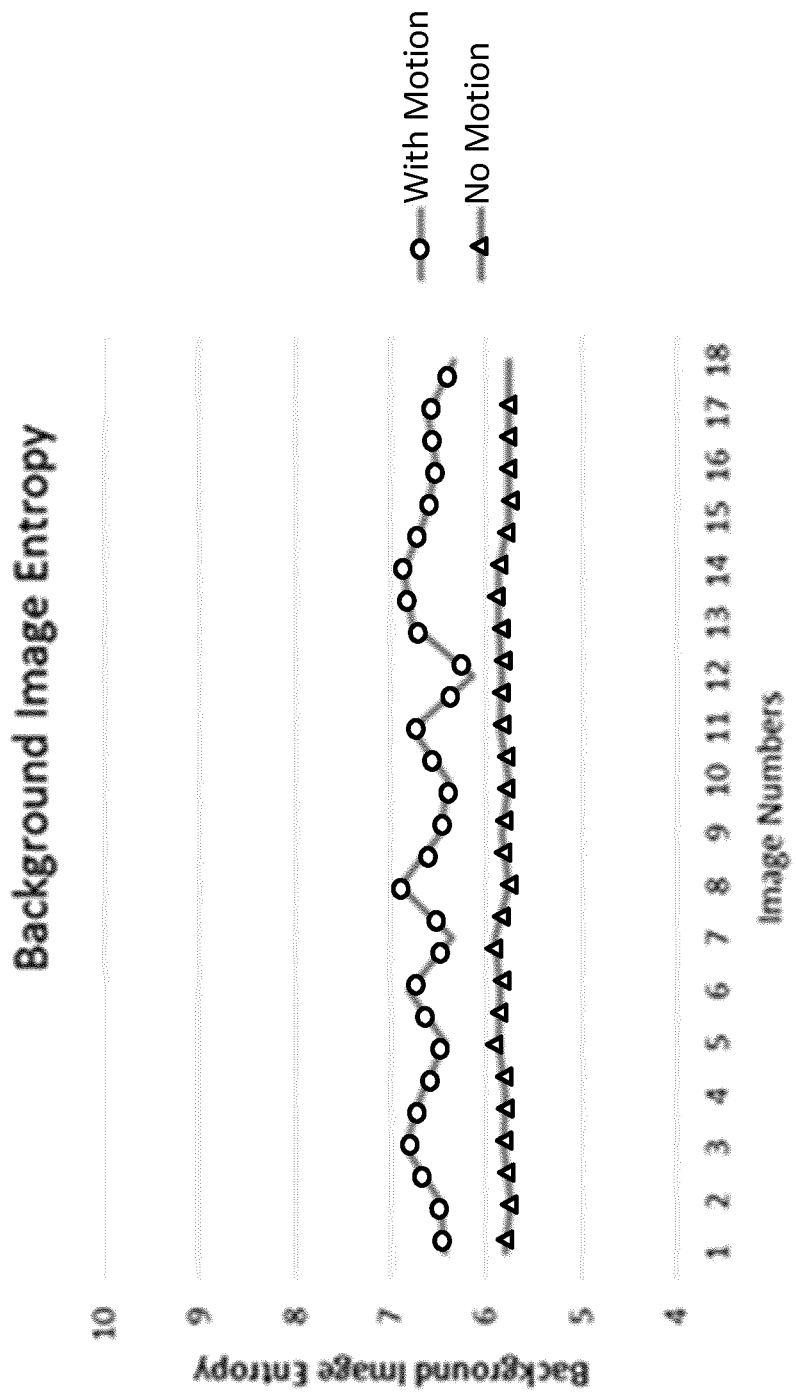
FIG. 10A is an exemplary plot of background image entropy for each of eighteen images for cases with motion and no motion, wherein the values of background image entropy for the case with motion are depicted using a line indicated with circles, and wherein values of background image entropy for the case with no motion are depicted using a line indicated with triangles.

More specifically, FIG. 10A depicts plots of background image entropy for each of eighteen images for cases with motion and no motion. The values of background image entropy for the case with motion are depicted using a line indicated with circles, whereas values of background image entropy for the case with no motion are depicted using a line indicated with triangles. From FIG. 10A it can be seen that values of background image entropy for the case with motion are higher and exhibit a higher variance between images than the case with no motion.

Figure 10B:
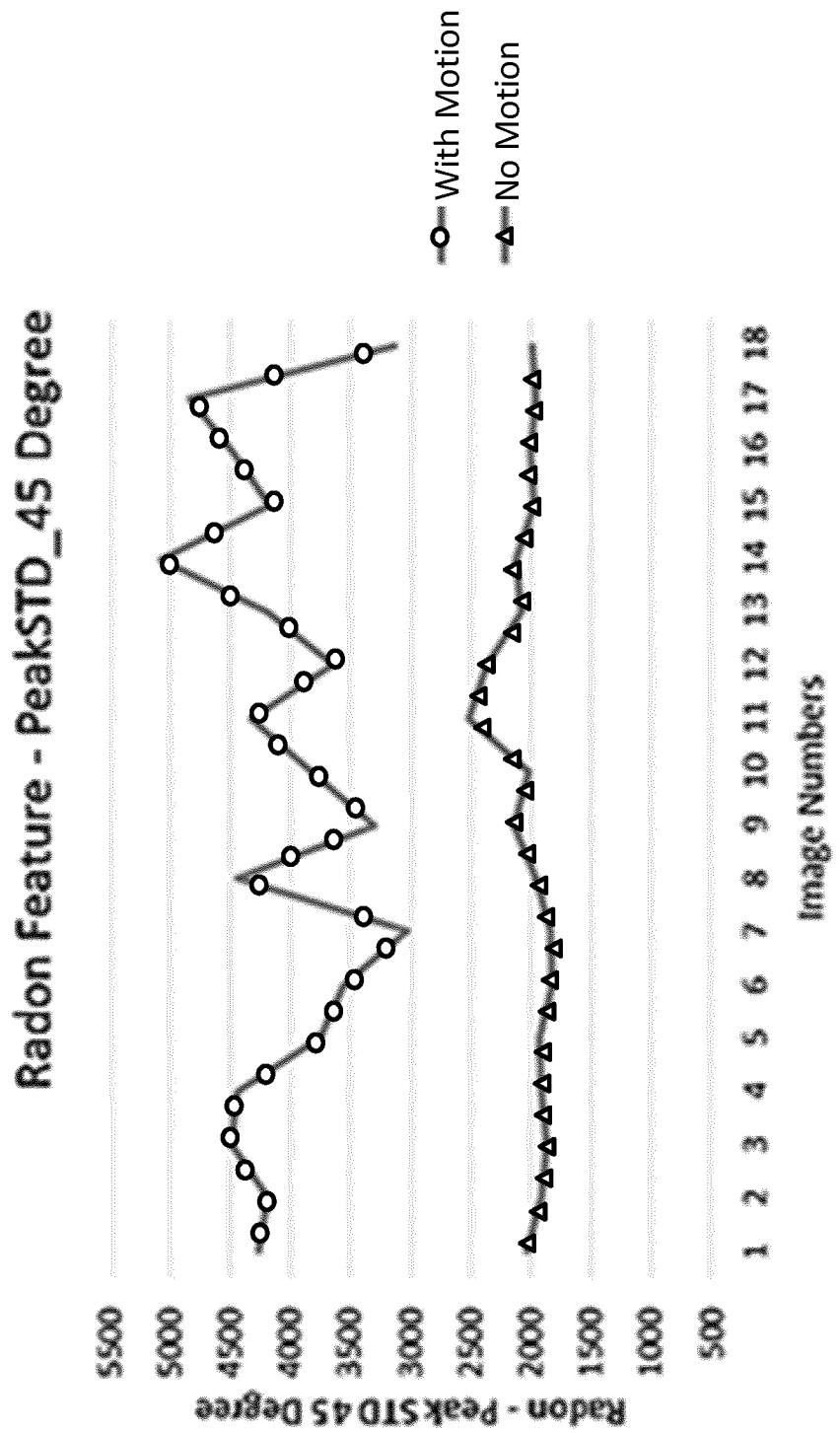
FIG. 10B is an exemplary plot of radon transform value (applied at 45 degrees) for each of eighteen images for cases with motion and no motion, wherein the values of the radon transform for the case with motion are depicted using a line indicated with circles, and wherein the values of the radon transform for the case with no motion are depicted using a line indicated with triangles.

Also, FIG. 10B depicts plots of radon transform value (applied at 45 degrees) for each of 18 images for cases with motion and no motion. The values of the radon transform for the case with motion are depicted using a line indicated with circles, whereas values of the radon transform for the case with no motion are depicted using a line indicated with triangles. From FIG. 10B it can be seen that the radon transform values for the case with motion are higher and exhibit a higher variance between images than the case with no motion.

Volume-Level Feature Determination

As explained above, foreground and background features may be extracted from medical slice images (i.e. at slice level). To derive motion information at a 'volume level' (i.e. information regarding feature movement in the scanned volume), it is proposed to translate the extracted features to an imaged volume level. Such features derived at imaged volume level may therefore be based on the foreground and background features extracted at slice level.

Motion information is typically required at imaged volume levels so as to enable segregation of the imaged volumes based on the levels/classification of motion (e.g. no motion, mild motion, moderate motion and severe motion). It is therefore proposed to aggregate slice-level feature information to a volume-level representation. For this, standard statistical parameters may be employed, thus facilitating a volume level representation to be obtained from the individual slice-level features.

Exemplary statistical parameters that may be used include: (i) Minimum, (ii) Mean, (iii) Maximum, (iv) Standard deviation, (v) Kurtosis, (vi) Ratio of maximum value to mean value, and (vii) Ratio of mean value to minimum value.

In addition, volume-level features are proposed which combine an energy level of slices and the extracted feature vectors at slice level. This combination may identify the feature vectors of the medical slice images that change predominately due to the motion rather than the anatomy.

By way of example, let E(n) and FV(n) represent energy and feature values of individual medical slice images, respectively. Also, let DE(n) and DF(n) respectively be the percentage of difference in energy levels and feature values of successive medical slice images with respect to the previous medical slice image. From these values, the following parameters may be extracted, wherein $\alpha_n$ is the learning parameter and is identified experimentally by varying the values provided in $\alpha_1$ and $\alpha_2$ to obtain the best performance:

Difference of Energy & Feature Values:
1. Find "N" such that; N:

$$DE(n) \leq \alpha_1 \,\&\, DF(n) \geq \alpha_2$$

2. Find N such that; N:

$$\frac{DF(n)}{DE(n)} \geq \alpha \text{ (or) } \frac{DF(n)}{DE(n)} \leq \frac{1}{\alpha}$$

Overall Change in Energy & Feature Values:
3. Find N such that; N:

$$FV(n) \geq \alpha_1 \frac{\sum_i^L FV(n)}{L} \,\&\, \alpha_2 \frac{\sum_i^L E(n)}{L}$$

Descriptive Statistics of Energy & Feature Values:
4. Descriptive statics of $$\frac{DF(n)}{DE(n)},$$

where $\alpha_1=\alpha_2=[0.5, 1, 1.5, 2, 3, 4]$ & $\alpha=[1, 1.5, 2, 3, 4]$

Motion Classification

The inventors have explored the use of several conventional classification methods for identifying an imaged volume as motion or no-motion. Such methods used with the default parameters are shown in Table 1 below.

TABLE 1

| Classifier Type | Parameters |
| --- | --- |
| Decision Tree | N_Tree = No. Features − 1 |
| | N_Leaf = 1 |
| KNN | k = sqrt(No. Features) |
| | Euclidean Distance |
| Random Forests | No_F = sqrt(No. Features) |
| Neural Networks | |
| Support Vector Machine (Linear) | |
| Support Vector Machine (Gaussian) | Sigma = 1 |
| Ensemble (Bagged Trees) | 63.2% of samples with replacement |
| | N_Weak_Learners = 30 |
| Ensemble (Boosted Trees) | N_Weak_Learners = 30 |

Results obtained through such investigations indicate that the Support Vector Machine (Gaussian) classification method provides the best results. However, this simply indicates that the Support Vector Machine (Gaussian) may be preferable in some instances (e.g. when the default parameters are used). It should therefore be understood that the other classification methods may be employed in other embodiments, and may even be preferable (e.g. provide more accurate results) in different circumstances.

Also, it is noted that, where a motion classification model employs a plurality of different classification methods, a preferred (e.g. more accurate) classification method may depend on the extracted feature(s). Accordingly, when determining a subject motion value, embodiments may include the concept of selecting one of a plurality of different classification method based on the feature(s) extracted from a medical slice image.

Background Feature Analysis to Detect Motion Slices

It is noted that, in full body scans, sometimes only a few medical image slices of the scanned volume might be corrupted with motion artifacts, and the rest of the medical slice images in the scanned volume may therefore be used for diagnosis purposes. Accordingly, identifying the specific medical slice image(s) corrupted by motion artifacts may be useful. For example, it may help to reduce a Field of View (FOV) in repeat scans. Such a reduction in FOV for repeat scans may increase patient comfort and/or improve scanning throughput.

By way of example, to identify motion at medical slice image level, it is proposed to use the background image features that capture motion ripples as described in above.

Figure 11:
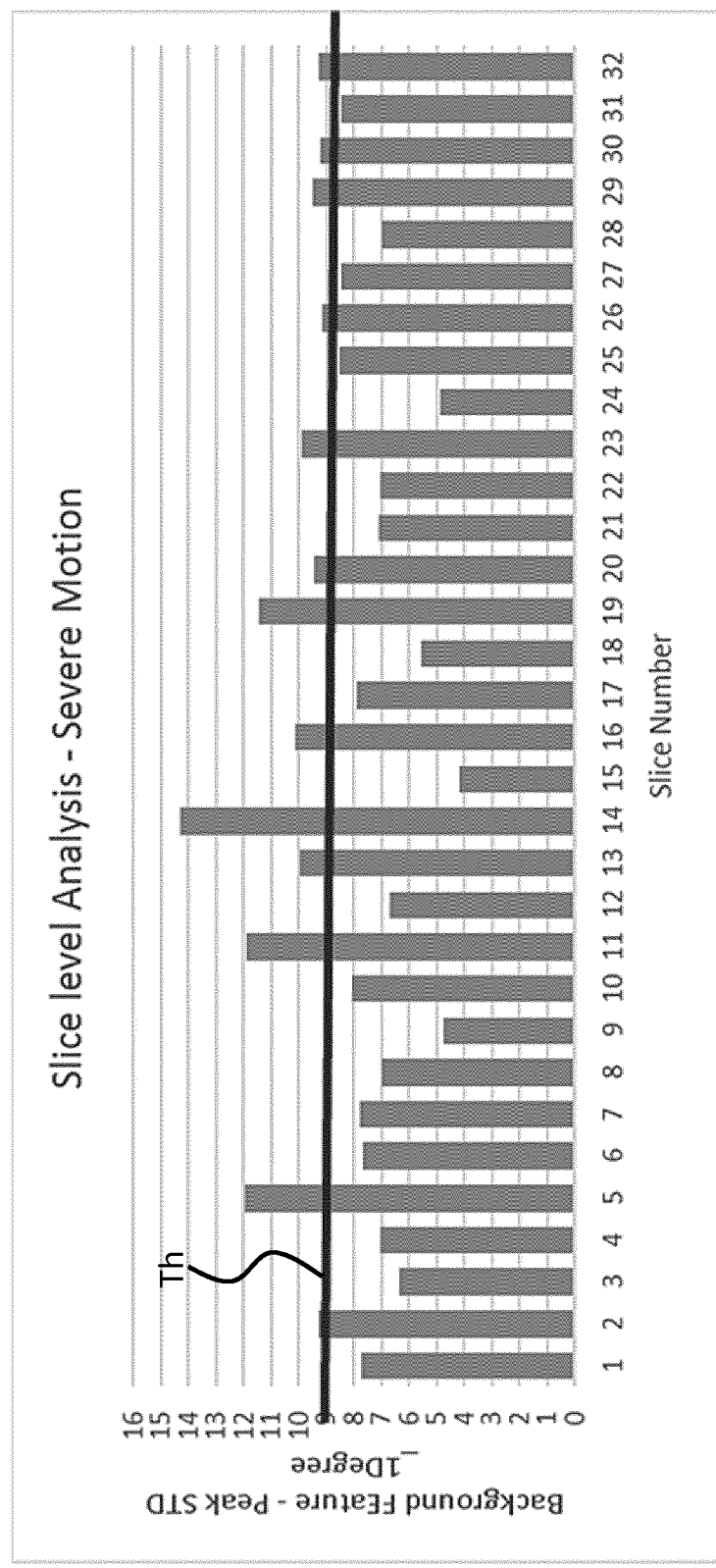
FIG. 11 depicts a graph plotting a peak motion value of background feature for each of a plurality of medical slice images, wherein the graph includes a bold line representing threshold value that may be used to distinguish between severe and non-severe motion for a medical slice image.

Referring to FIG. 11, there is depicted a graph plotting a peak motion value of background feature for each of a plurality of medical slice images. On the graph, a bold line represents a threshold value (Th) that may be used to distinguish between severe and non-severe motion for a medical slice image.

The threshold value may, for example, be learnt from a training set that can differentiate severe and non-severe motion at slice level. Additionally, or alternatively, the threshold value may be determined based on historical data relating to previously determined motion of image features.

From FIG. 11, it is seen that medical slice images having a peak motion value exceeding the threshold can be easily identified. In this way, embodiments may be adapted to differentiate severe and non-severe motion in individual medical slice images.

Figure 12:
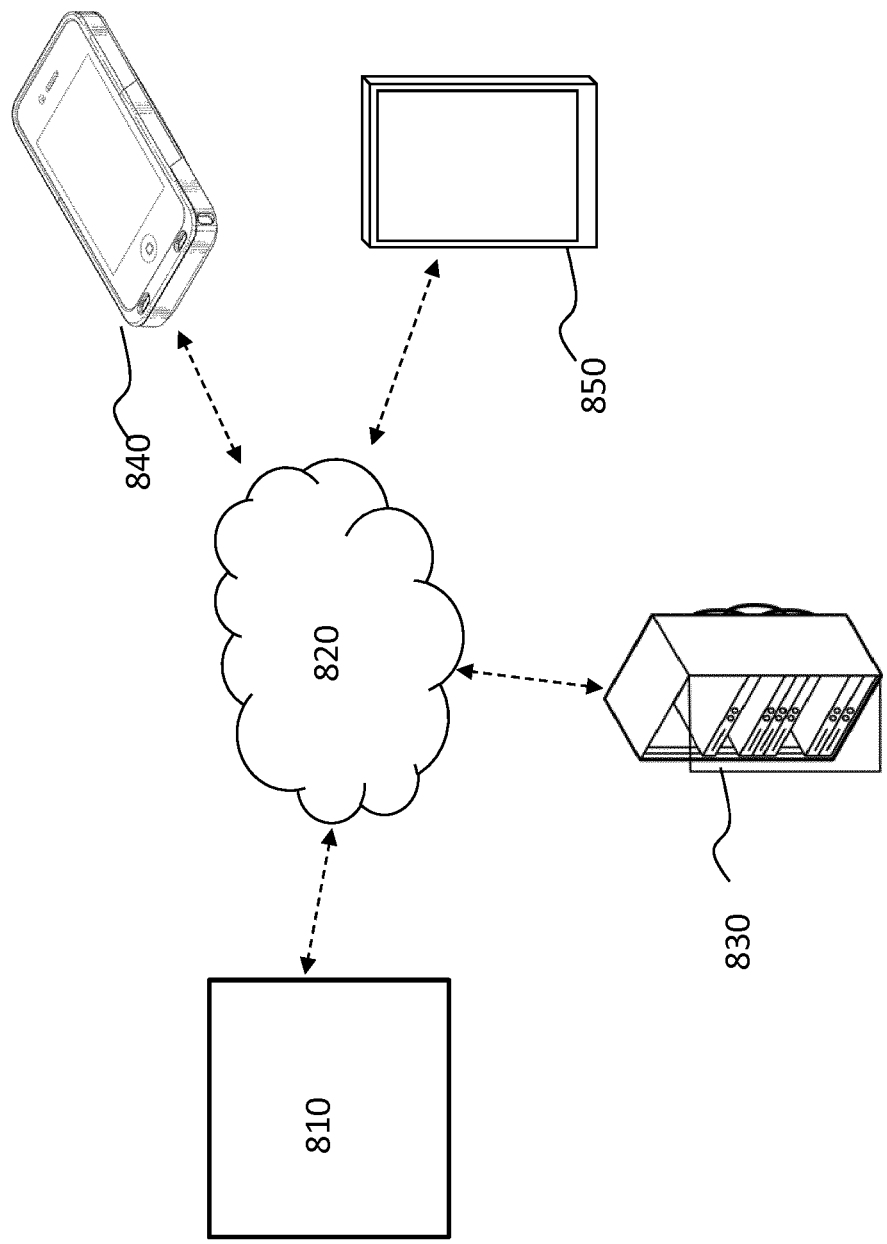
FIG. 12 is a simplified block diagram of a system detecting subject motion in medical imaging of a subject according to another embodiment.

Referring now to FIG. 12, there is depicted another embodiment of a system according to the invention comprising a CT scanning system 810 adapted to scan a volume of a subject and generate a plurality of CT image slices the scanned volume. Here, the CT scanning system 810 comprises a conventional CT scanning system 810 that may, for example, be available for use in a CT scanning/imaging facility.

The CT scanning system 810 communicates output signals representative of acquired CT image slices via the internet 820 (using a wired or wireless connection for example) to a remotely located data processing system 830 for detecting subject motion in MRI of a subject (such as server).

The data processing system 830 is adapted to receive the one or more output signals from the CT scanning system 810 (e.g. as CT image slice data). The system is also adapted to obtain a motion classification model representing relationships between motion of CT image features and subject motion values (e.g. from a local or remote database and/or via a user input interface).

The data processing system 830 processes the CT scanning system output signals and the motion classification model in accordance with a method according to a proposed embodiment to determine a subject motion value. More specifically, the method: extracts an MRI feature of each MRI slice image; determines motion information for the MRI feature based on the extracted MRI feature for each of the plurality of MRI slice images, the motion information representing motion of the MRI feature in the MRI volume of the subject; and then determines a subject motion value based on the motion information for the MRI feature and the obtained motion classification model.

The data processing system 830 is further adapted to generate output signals representative of a determined subject motion value. Thus, the data processing 830 provides a centrally accessible processing resource that can receive information from MRI system and run one or more algorithms to detect subject motion in the MRI of the subject. Information relating to the detected subject motion can be stored by the data processing system (for example, in a database) and provided to other components of the system. Such provision of information about a detected or inferred subject motion may be undertaken in response to a receiving a request (via the internet 820 for example) and/or may be undertaken without request (i.e. 'pushed').

For the purpose of receiving information about a detected or inferred subject motion from the data processing system, and thus to enable the subject motion to be monitored accurately and/or in context, the system further comprises first 840 and second 850 mobile computing devices.

Here, the first mobile computing device 840 is a mobile telephone device (such as a smartphone) with a display for displaying graphical elements representative of detected subject motion. The second mobile computing device 850 is a mobile computer such as a Laptop or Tablet computer with a display for displaying graphical elements representative of detected subject motion during a CT scan.

The data processing system 830 is adapted to communicate output signals to the first 840 and second 850 mobile computing devices via the internet 820 (using a wired or wireless connection for example). As mentioned above, this may be undertaken in response to receiving a request from the first 840 or second 850 mobile computing devices.

Based on the received output signals, the first 840 and second 850 mobile computing devices are adapted to display one or more graphical elements in a display area provided by their respective display. For this purpose, the first 840 and second 850 mobile computing devices each comprise a software application for processing, decrypting and/or interpreting received output signals in order to determine how to display graphical elements. Thus, the first 840 and second 850 mobile computing devices each comprise a processing arrangement adapted to one or more values representative of detected subject motion, and to generate a display control signal for modifying at least one of the size, shape, position, orientation, pulsation or colour of the graphical element based on the detected motion.

The system can therefore communicate information about an inferred or detected motion of subject in a CT scan to users of the first 840 and second 850 mobile computing devices. For example, each of the first 840 and second 850 mobile computing devices may be used to display graphical elements to a medical practitioner, a radiologist or the subject.

Implementations of the system of FIG. 12 may vary between: (i) a situation where the data processing system 830 communicates display-ready data, which may for example comprise display data including graphical elements (e.g. in JPEG or other image formats) that are simply displayed to a user of a mobile computing device using conventional image or webpage display (which can be web based browser etc.); to (ii) a situation where the data processing system 830 communicates raw data set information that the receiving mobile computing device then processes to detect subject motion, and then displays graphical elements based on the detected motion (for example, using local software running on the mobile computing device). Of course, in other implementations, the processing may be shared between the data processing system 830 and a receiving mobile computing device such that part of the data generated at data processing system 830 is sent to the mobile computing device for further processing by local dedicated software of the mobile computing device. Embodiments may therefore employ server-side processing, client-side processing, or any combination thereof.

Further, where the data processing system 830 does not 'push' information (e.g. output signals), but rather communicates information in response to receiving a request, the user of a device making such a request may be required to confirm or authenticate their identity and/or security credentials in order for the information to be communicated.

Figure 13:
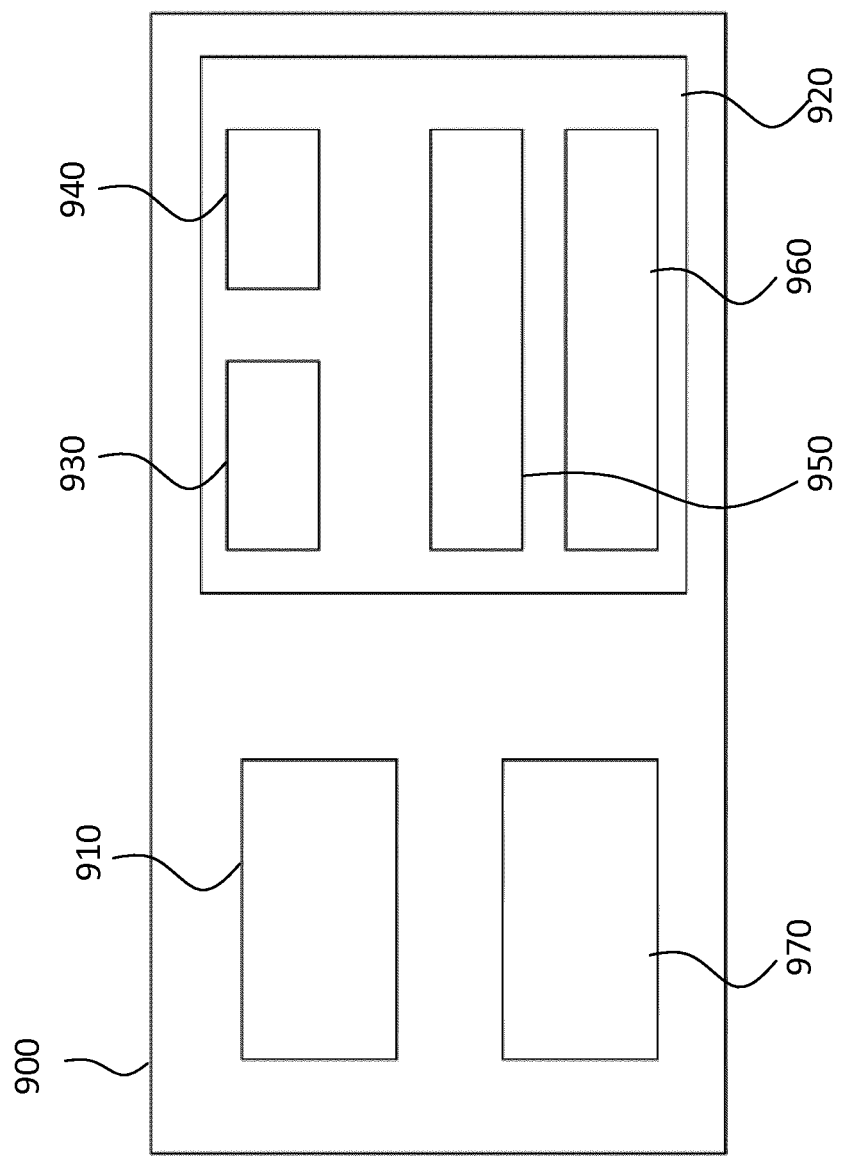
FIG. 13 is a simplified block diagram of a computer within which one or more parts of an embodiment may be employed.

FIG. 13 illustrates an example of a computer 900 within which one or more parts of an embodiment may be employed. Various operations discussed above may utilize the capabilities of the computer 900. For example, one or more parts of a system for detecting subject motion may be incorporated in any element, module, application, and/or component discussed herein.

The computer 900 includes, but is not limited to, PCs, workstations, laptops, PDAs, palm devices, servers, storages, and the like. Generally, in terms of hardware architecture, the computer 900 may include one or more processors 910, memory 920, and one or more I/O devices 970 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a digital signal processor (DSP), or an auxiliary processor among several processors associated with the computer 900, and the processor 910 may be a semiconductor based microprocessor (in the form of a microchip) or a microprocessor.

The memory 920 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 may incorporate electronic, magnetic, optical, and/or other types of storage media. Note that the memory 920 can have a distributed architecture, where various components are situated remote from one another, but can be accessed by the processor 910.

The software in the memory 920 may include one or more separate programs, each of which comprises an ordered listing of executable instructions for implementing logical functions. The software in the memory 920 includes a suitable operating system (O/S) 950, compiler 940, source code 930, and one or more applications 960 in accordance with exemplary embodiments. As illustrated, the application 960 comprises numerous functional components for implementing the features and operations of the exemplary embodiments. The application 960 of the computer 900 may represent various applications, computational units, logic, functional units, processes, operations, virtual entities, and/or modules in accordance with exemplary embodiments, but the application 960 is not meant to be a limitation.

The operating system 950 controls the execution of other computer programs, and provides scheduling, input-output control, file and data management, memory management, and communication control and related services. It is contemplated by the inventors that the application 960 for implementing exemplary embodiments may be applicable on all commercially available operating systems.

Application 960 may be a source program, executable program (object code), script, or any other entity comprising a set of instructions to be performed. When a source program, then the program is usually translated via a compiler (such as the compiler 940), assembler, interpreter, or the like, which may or may not be included within the memory 920, so as to operate properly in connection with the O/S 950. Furthermore, the application 960 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, php. Python, ASP scripts, FORTRAN, COBOL, Perl, Java, ADA, .NET, and the like.

The I/O devices 970 may include input devices such as, for example but not limited to, a mouse, keyboard, scanner, microphone, camera, etc. Furthermore, the I/O devices 970 may also include output devices, for example but not limited to a printer, display, etc. Finally, the I/O devices 970 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 970 also include components for communicating over various networks, such as the Internet or intranet.

If the computer 900 is a PC, workstation, intelligent device or the like, the software in the memory 920 may further include a basic input output system (BIOS) (omitted for simplicity). The BIOS is a set of essential software routines that initialize and test hardware at startup, start the O/S 950, and support the transfer of data among the hardware devices. The BIOS is stored in some type of read-only-memory, such as ROM, PROM, EPROM, EEPROM or the like, so that the BIOS can be executed when the computer 900 is activated.

When the computer 900 is in operation, the processor 910 is configured to execute software stored within the memory 920, to communicate data to and from the memory 920, and to generally control operations of the computer 900 pursuant to the software. The application 960 and the O/S 950 are read, in whole or in part, by the processor 910, perhaps buffered within the processor 910, and then executed.

When the application 960 is implemented in software it should be noted that the application 960 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 960 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, optimized for embedded implementation, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it will be appreciated that embodiments may therefore be useful for detecting and classifying motion of a subject during an MRI scan. Detected subject motion can be used both for real-time monitoring and alerts, as well as to detect when MRI images are/aren't reliable.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand that various embodiments with various modifications are contemplated.

The invention claimed is:

1. A method for detecting subject motion in medical imaging of a subject, the method comprising:
   obtaining a motion classification model representing relationships between motion of image features and previously determined subject motion values for a plurality of different classification methods;
   for each medical slice image of a plurality of medical slice images of an imaged volume of the subject, extracting an image feature of the medical slice image;
   based on the extracted image feature for each medical slice image of the plurality of medical slice images, determining motion information for the image feature, the motion information representing motion of the image feature in the imaged volume of the subject;
   selecting relationships between the motion of image features and the previously determined subject motion values for a classification method of the plurality of different classification methods based on the extracted image feature; and
   determining a subject motion value based on the motion information for the image feature and the selected relationships between the motion of image features and the previously determined subject motion values.

2. The method of claim 1, wherein obtaining the motion classification model comprises:
   generating the motion classification model based on historical data relating to the previously determined subject motion values for image features extracted from medical slice images.

3. The method of claim 2, wherein obtaining the motion classification model further comprises:
   refining the motion classification model using a machine learning algorithm with training data relating to subject motion values for image features of medical slice images.

4. The method of claim 1, wherein extracting the image feature of the medical slice image comprises:
   separating the medical slice image into a foreground and a background; and
   extracting a foreground image feature from the foreground.

5. The method of claim 4, wherein extracting the foreground image feature comprises:
   identifying an image feature from at least one of: a spatial domain representation of the foreground, a wavelet domain representation of the foreground, or a spectral domain representation of the foreground; and
   extracting the identified image feature as the foreground image feature.

6. The method of claim 1, wherein extracting the image feature of the medical slice image comprises:
   segregating the medical slice image into a foreground and a background; and
   extracting a background image feature from the background.

7. A method for detecting subject motion in medical imaging of a subject, the method comprising:
   obtaining a motion classification model representing relationships between motion of image features and previously determined subject motion values;
   for each of a plurality of medical slice images of an imaged volume of the subject, extracting an image feature of the medical slice image, wherein extracting the image feature comprises:
      segregating the medical slice image into a foreground and a background;
      applying radon transformations to the background to generate a plurality of radon transform profiles;
      identifying a background image feature based on the radon transform profiles; and
      extracting the identified background image feature as the image feature:
   based on the extracted image feature for each of the plurality of medical slice images, determining motion information for the image feature, the motion information representing motion of the image feature in the imaged volume of the subject; and
   determining a subject motion value based on the motion information for the image feature and the obtained motion classification model.

8. The method of claim 1, further comprising:
   based on the motion information for the image feature, identifying a medical slice image in which motion of the extracted image feature exceeds a threshold value.

9. The method of claim 8, further comprising:
   determining the threshold value based on historical data relating to previously determined motion of the image feature.

10. A non-transitory computer readable medium storing computer program code instructions for detecting subject motion in medical imaging of a subject, which when executed by at least one processor, cause the at least one processor to implement the method of claim 1.

11. A system for detecting subject motion in medical imaging of a subject, the system comprising:
    an interface configured to obtain a motion classification model representing relationships between motion of image features and previously determined subject motion values for a plurality of different classification methods; and at least one processor configured to:
    extract an image feature of each medical slice image of a plurality of medical slice images of an imaged volume of the subject;
    determine motion information for the image feature based on the extracted image feature of each medical slice image of the plurality of medical slice images, the motion information representing motion of the image feature in the imaged volume of the subject;
    select relationships between the motion of image features and the previously determined subject motion values for a classification method of the plurality of different classification methods based on the extracted image feature; and
    determine a subject motion value based on the motion information for the image feature and the obtained motion classification model.

12. The system of claim 11, wherein the interface is further configured to obtain the motion classification model based on historical data relating to the previously determined subject motion values for image features extracted from medical slice images.

13. The system of claim 11, wherein the at least one processor is further configured to extract the image feature by separating the medical slice image into a foreground and a background, and extracting at least one of a foreground image feature from the foreground or a background image feature from the background as the extracted image feature.

14. The system of claim 13, wherein extracting the foreground image feature comprises:
  identifying an image feature from at least one of: a spatial domain representation of the foreground, a wavelet domain representation of the foreground, or a spectral domain representation of the foreground; and
  extracting the identified image feature as the foreground image feature.

15. The system of claim 13, wherein extracting the background image feature comprises:
  applying radon transformations to the background to generate a plurality of radon transform profiles;
  identifying an image feature based on the radon transform profiles; and
  extracting the identified image feature as the background image feature.

16. The system of claim 11, wherein the at least one processor is further configured to identify a medical slice image in which motion of the extracted image feature exceeds a threshold value based on the motion information for the image feature.

17. The system of claim 11, wherein the at least one processor is further configured to indicate when the subject has moved excessively during the medical imaging based on the subject motion value.

18. The method of claim 1, further comprising:
  indicating when the subject has moved excessively during the medical imaging based on the subject motion value.

19. The method of claim 7, wherein obtaining the motion classification model comprises:
  generating the motion classification model based on historical data relating to the previously determined subject motion values for image features extracted from medical slice images.

20. The method of claim 7, further comprising:
  based on the motion information for the image feature, identifying a medical slice image in which motion of the extracted image feature exceeds a threshold value.

* * * * *